Figure 1:
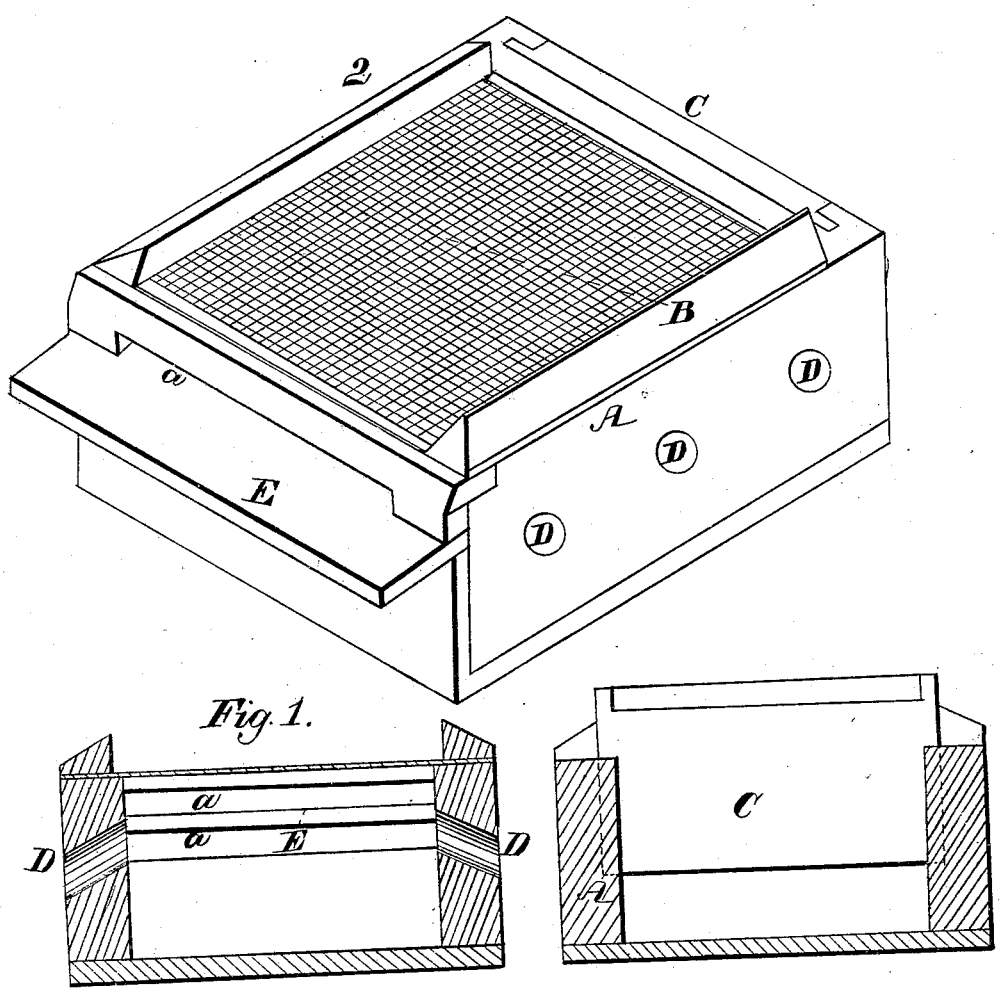

H. M. SHAFFER.
Bee Hive.

No. 30,255.

Patented Oct. 2, 1860.

Witnesses;

Inventor;

UNITED STATES PATENT OFFICE.

HIRAM M. SHAFFER, OF BUCYRUS, OHIO.

BEEHIVE.

Specification of Letters Patent No. 30,255, dated October 2, 1860.

*To all whom it may concern:*

Be it known that I, HIRAM M. SHAFFER, of Bucyrus, in the county of Crawford and State of Ohio, have invented certain new and useful Improvements in Beehive-Traps; and I do hereby declare that the following is a full, clear, and exact description of the same, reference being had to the accompanying drawings and to the letters of reference marked thereon.

The nature of my invention consists in constructing and arranging the several parts of this trap substantially in the manner hereinafter described.

In the annexed drawings, making a part of this specification, A, represents a square box, made of any suitable size or depth, upon top of which a beehive is placed. The top of this box is covered with fine gauze wire, as shown in Fig. 2. Two sides of the box, are pierced with holes D, D, which incline in the manner represented, passing up as they enter the box, so that the rays of light will not pass in through them to the interior of the box.

E, represents a flange or shelf which is secured to one side of the box. Long openings are cut in the box just above and just below the shelf E, through which the miller may enter the box. These openings are not made large enough to allow bees to pass in and out through them, being only intended for the ingress and egress of the miller.

C represents a sliding door which shuts or opens one side of the box as seen.

In using this trap it will be found very convenient for catching the moth and the robber bees.

The beehive being placed upon this trap the offal from the bees passes down into the bottom of said trap through the gauze wire. The miller will pass into the box above and below the shelf E, and will among the trash, &c., on the bottom deposit its eggs. When the moth is produced, he cannot get into the hive and must there remain and die. When the robber bees come to rob the hive, they will not pass to the hive through the same entrance with the working bees, as it will be watched and guarded. Thinking they can get in through the box, they will pass up the openings D, and seeing the light through openings *a*, and not being able to get to the hive they will endeavor to pass out at *a*, like flies at a window, and will thus be effectually entrapped. The light not passing in at D, they will not pass back in that direction.

Having thus fully described my invention, what I claim as new, and desire to secure by Letters Patent, is—

The within described miller and robber trap constructed substantially in the manner specified to wit, a box, A, provided with a wire gauze cover, and having two of its sides pierced with inclined holes, D, D, one of its sides provided with a sliding door and the other side provided with a flange or shelf, beneath and above which long openings are cut, the whole being arranged and used as and for the purpose set forth.

HIRAM M. SHAFFER.

Witnesses:
CHARLES M. DODSON,
JOHN SMITH.